United States Patent [19]

Gaumond

[11] 4,230,926
[45] Oct. 28, 1980

[54] ELECTRIC DISCHARGE MACHINE WITH MECHANISM FOR ORBITING THE ELECTRODE

[76] Inventor: William J. Gaumond, 2556 N. 96th St., Wauwatosa, Wis. 53226

[21] Appl. No.: 901,958

[22] Filed: May 1, 1978

[51] Int. Cl.³ .............................................. B23P 1/12
[52] U.S. Cl. ................................................ 219/69 V
[58] Field of Search ............. 219/69 V, 69 G; 74/25, 74/26, 48, 50, 53, 54, 55, 56, 568 R, 569, 89.18

[56] References Cited

U.S. PATENT DOCUMENTS

| | | | |
|---|---|---|---|
| 3,535,578 | 10/1970 | Rayner | 219/69 G |
| 3,539,754 | 11/1970 | Furze et al. | 219/69 V |
| 3,809,852 | 5/1974 | Weber | 219/69 V |
| 4,104,501 | 8/1978 | Wyss | 219/69 V |

*Primary Examiner*—B. A. Reynolds
*Assistant Examiner*—Clifford C. Shaw
*Attorney, Agent, or Firm*—Wheeler, Morsell, House & Fuller

[57] ABSTRACT

An electric discharge machine has an electrode and mechanism for driving the electrode on an orbital path. The electrode is mounted on an electrode holder having an upstanding post. The electrode is driven on its orbital path by a rotor about the post. There are two resiliently loaded drive arms mounted on the rotor and engaged with the post at circumferentially spaced points so that the post is subject to the compound driving force of both drive arms. Centering mechanism is provided to restore the electrode to a centered position with respect to its orbit in the event of a short circuit between the electrode and the workpiece, thus to break the short circuit.

4 Claims, 7 Drawing Figures

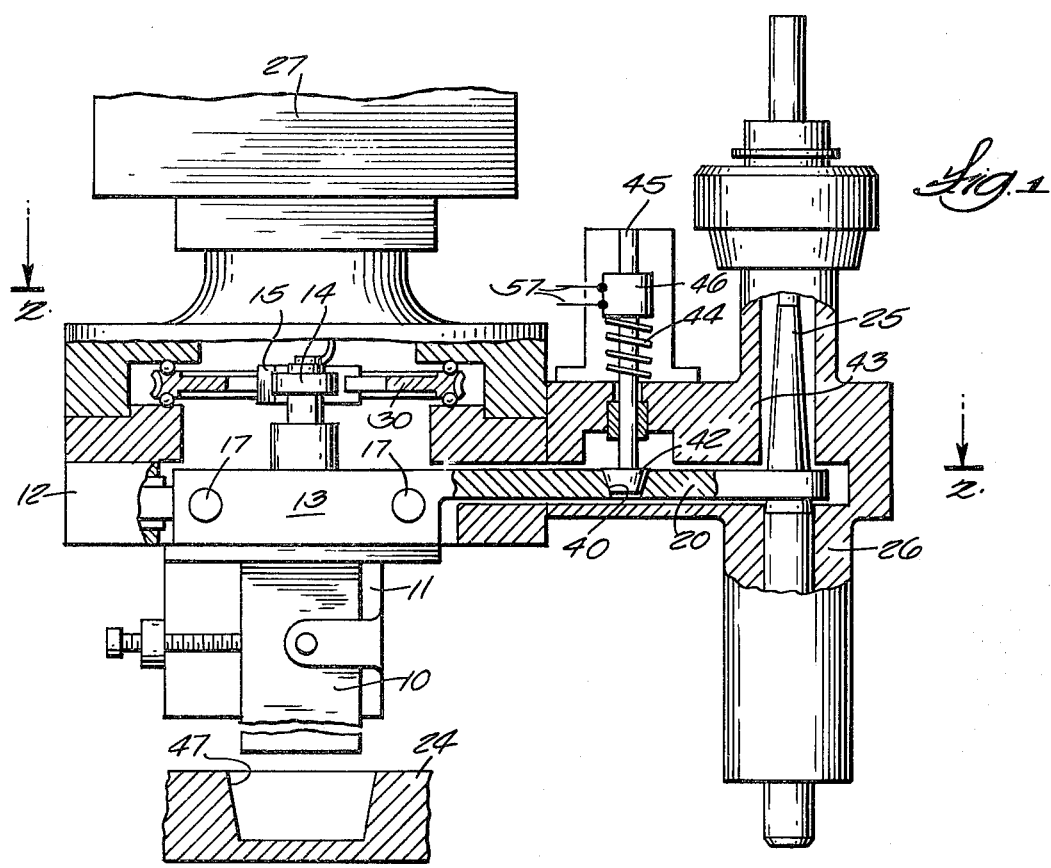
Fig. 1
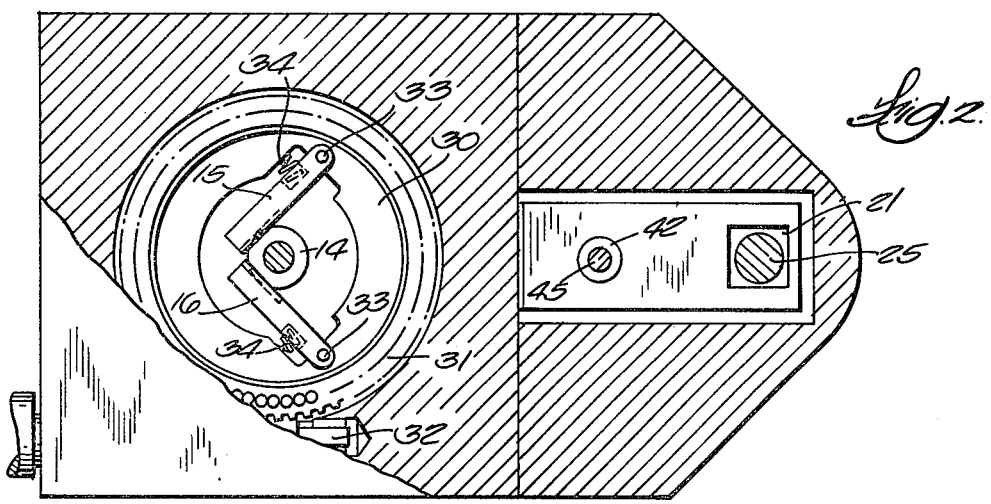
Fig. 2
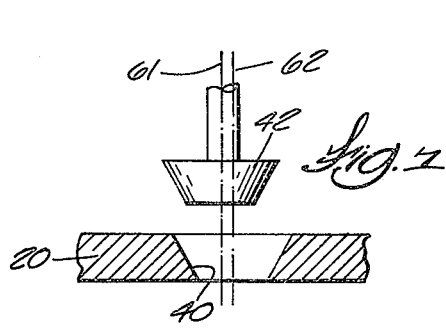
Fig. 7
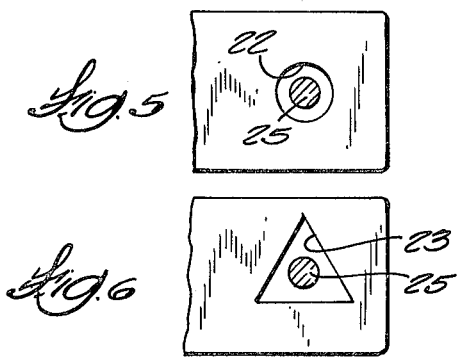
Fig. 5
Fig. 6

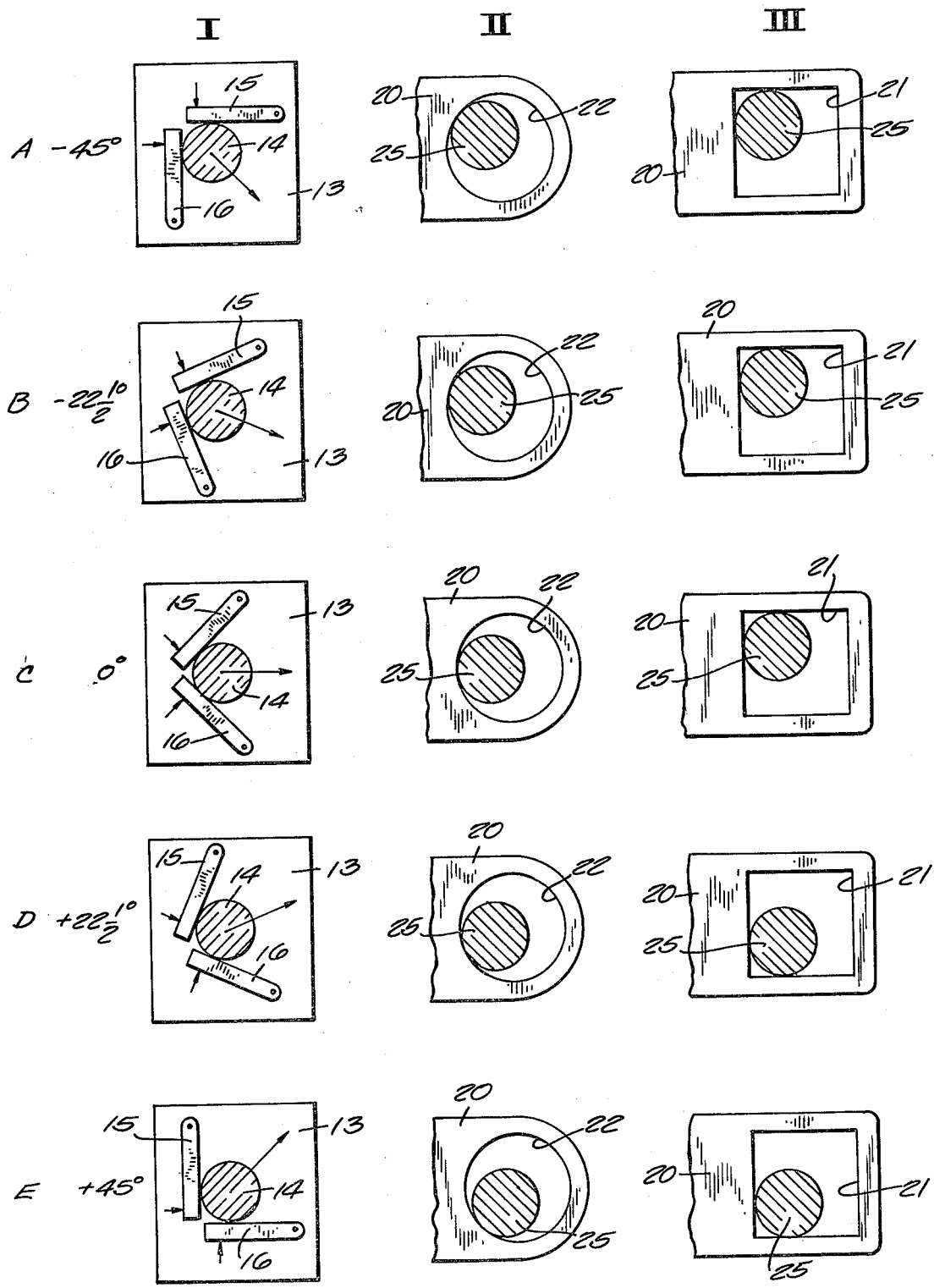

ELECTRIC DISCHARGE MACHINE WITH MECHANISM FOR ORBITING THE ELECTRODE

BACKGROUND OF THE INVENTION

U.S. Pat. No. 3,809,852 of May 7, 1974, shows a single arm driving mechanism for an orbiting electrode. It has been found that friction in the mechanism inhibits smooth transfer of driving force from the arm to the electrode holder and may result in erratic movement of the electrode on its orbital path, and/or impact shocks as the electrode holder cycles from one position to another.

SUMMARY OF THE INVENTION

Smooth orbiting performance of the above-mentioned machine has been achieved by adding a second resiliently loaded drive arm mounted to engage the post on the electrode holder at a point offset from the point of engagement with the post of the original drive arm. Accordingly, the electrode is subject to the compound driving force of both drive arms and by reason of the angle relationship between the two arms and the rotary motion of the drive arm mounting bracket, the load is shared between the two arms to a varying degree, depending upon the position of the parts.

During part of the orbiting cycle, in the case of a polygon shape orbit defining hole, one arm is dominant and the other arm is subservient and exerts an opposing force less than the force of the dominant arms. In the case of a circular shape orbit defining hole, both arms exert substantially equal force. In the case of a polygon shape orbit defining hole, the opposing force of the subservient arm inhibits and cushions abrupt movement of the electrode and prevents shock impacts between a guide rod and guide follower. In other parts of the cycle the two arms change roles and the dominant arm becomes subservient and vice versa. In all cases the subservient arm tends to smooth the transfer of force from the dominant arm to the electrode holder and relieve friction which inherently exists within the system and which tends to introduce erratic movements into the orbiting movement of the electrode. The two arms coact to impose pressure gradually on the electrode and smooth out its movement.

In electric discharge machines embodying the orbiting electrode of U.S. Pat. No. 3,809,852, there is a tendency in some cases for the electrode to short circuit against the workpiece. The built-in servo control system of the electric discharge machine will then function to retract the electrode away from the workpiece to clear the short circuit. Clearing the short circuit is expedited in the device of the present invention by the mechanism herein disclosed which will withdraw the electrode laterally from proximity to the workpiece and center it with respect to its orbit. This action speeds up clearance of the short circuit and reduces the time during which the machine is not cutting the workpiece.

Other objects, features and advantages of the invention will appear from the disclosure hereof.

DESCRIPTION OF THE DRAWINGS

FIG. 1 is a side view, partly in cross section, showing an electrode orbiting mechanism embodying the invention.

FIG. 2 is a cross section taken on the line 2—2 of FIG. 1.

FIG. 3 constitutes a series of diagrammatic illustrations, showing the electrode drive mechanism in various positions and illustrating the functioning of the double arm drive mechanism.

FIG. 5 is a fragmentary view showing circular orbit defining hole in the guide follower arm.

FIG. 6 is a fragmentary view showing a triangular orbit defining hole in the guide follower arm.

FIG. 7 is a fragmentary sectional view of the electrode centering mechanism.

DESCRIPTION OF THE PREFERRED EMBODIMENT

Figure 4:
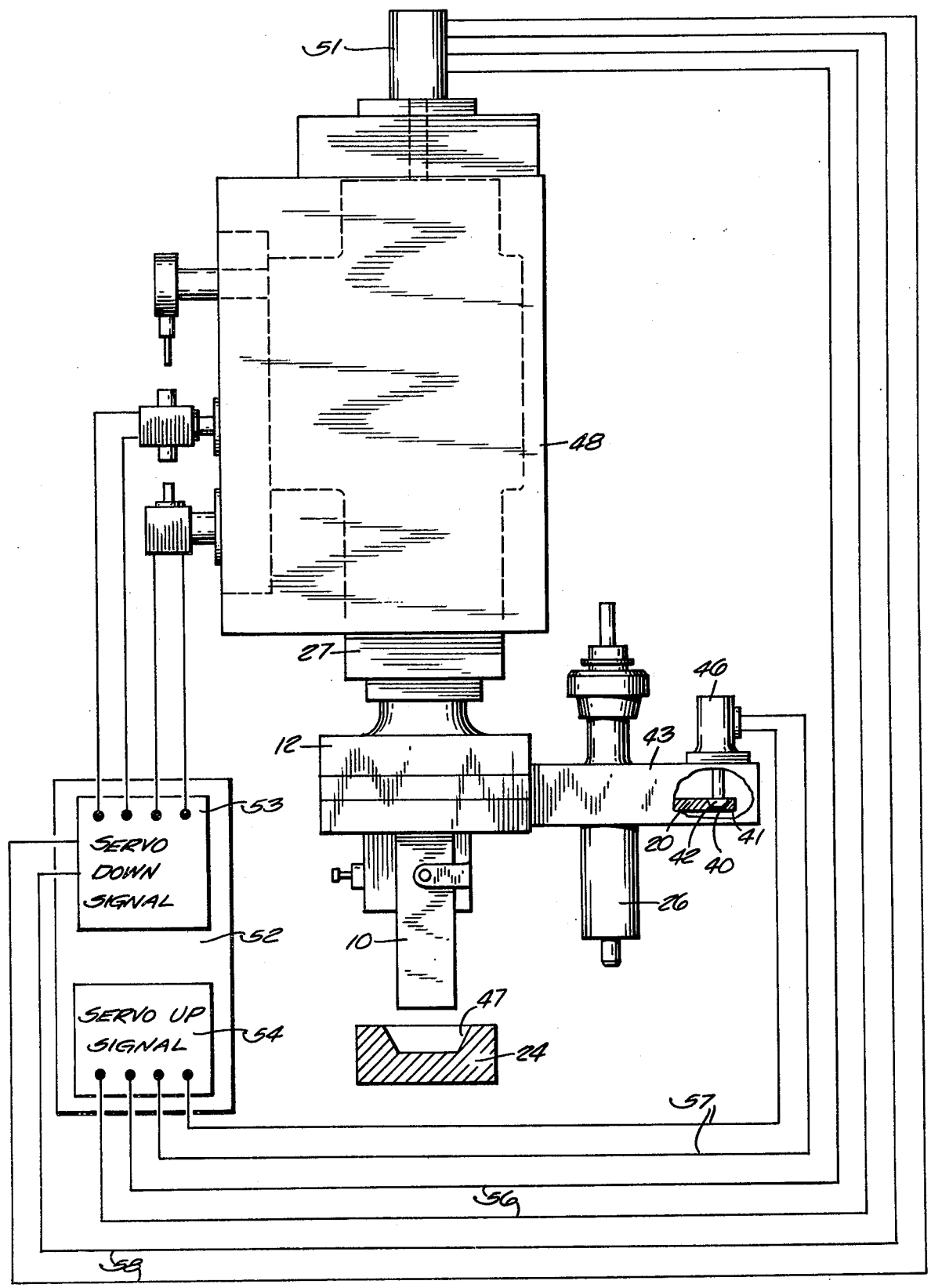
FIG. 4 is a diagrammatic view showing the control system for the electrode centering mechanism.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The disclosure of U.S. Pat. No. 3,809,852 issued May 7, 1974, is incorporated by reference herein. Accordingly, it will be unnecessary to describe in detail the complete operation of the electric discharge machine and its mechanism for orbiting the electrode inasmuch as that subject matter is fully disclosed in U.S. Pat. No. 3,809,852. Only so much of the device as is pertinent to the present invention will be described herein.

As in the prior patent, an electrode 10 is mounted for universal orbiting movement on a shuttle block 13 in an electrode holder housing 12. Shuttle block 13 slides universally on slideways 17 such as are illustrated in more detail in FIG. 3 of the prior patent. Shuttle block 13 is provided with an upstanding post 14 subject to the pressure of two resiliently mounted drive arms 15, 16. The utilization of two such drive arms constitutes an important distinction from the device illustrated in Patent No. 3,809,852 in which there is but a single such drive arm.

Shuttle block 13 is provided with a lateral extension 20 which has near its end an orbit defining hole 21. Hole 21 may take various shapes, depending upon the desired orbit. As illustrated in FIG. 2, it may have a square configuration. Alternatively, it could be circular as shown in FIG. 5 at 22, or triangular as shown at 23 in FIG. 6. For the purposes of creating sharp corners in the cavity produced by the electrode, in accordance with Patent No. 3,809,852, the hole should constitute a regular polygon. If the circular hole 22 of FIG. 5 is used, sharp angular corners cannot be produced. However, in some cases where arcuate corners can be tolerated, the circular hole 22 of FIG. 5 may be utilized.

Lateral extension 20 with its hole 21 or 22 or 23 comprises a guide follower which controls the size and shape of the orbit of electrode 10 with respect to the workpiece, such as workpiece 24 shown in FIGS. 1 and 4. As fully described in Patent No. 3,809,852, the guide follower follows a tapered guide rod 25 which is mounted in a housing 26. The taper of rod 25 is utilized to gradually decrease the orbit of the electrode 10 as the quill 27 of the electric discharge machine advances the electrode toward the workpiece 24 to produce cavity 47 therein.

Both resiliently loaded drive arms 15, 16 are mounted on a rotor 30 which has a peripheral gear 31 meshing with a drive worm 32, in the same manner as is illustrated in the prior patent. Rotor 30 surrounds the post 14. Each drive arm 15, 16 is pivotally mounted to the rotor 30 on its own pivot pin 33. Each arm has a spring 34 by which the post 14 is subject to resilient bias. Accordingly, each arm 15, 16 can follow the post in the orbital movement of the shuttle block 13 as determined by movement of the guide follower 20 and its holes 21, 22, 23 about the guide rod 25.

If no friction existed in the system, a single drive arm, such as shown in prior Patent No. 3,809,852, would transfer force from the rotor 30 to shuttle block 13 in a smooth manner. However, friction is inherent in the system and it has been found that such friction tends to produce sticking of the shuttle block and its laterally extending arm 20 against adjacent bearing surfaces in which these parts move. Such sticking affects transfer time of the movable parts from one position to another and also varies actual burning time in the electric discharge machine errosion of the workpiece for each increment of such movement. Such unequal time lapses in the various parts of the orbital cycle of the electrode has an adverse effect upon the quality of the machining operation.

Moreover, where orbit defining holes 21, 23 of polygon form are employed, it has been found that energy stored in the spring loaded arm may be released abruptly, thus causing impact of the flat sides of the guide follower hole 21, 23 against the guide rod 25. This impact or "slamming" can induce vibration in the unit and causes erratic operation because of the sensitivity of the servo system of the machine tool and can also adversely effect workpiece accuracy.

The dual drive arm structure herein disclosed improves the system both by cushioning or shock absorption of the impact or slamming of the guide follower against the guide rod and also eliminates or reduces erratic movements caused by friction of the parts. These advantages are achieved because the subservient arm exerts a component of pressure on the post which opposes the pressure of the dominant arm and hence smooths out the application of force and also provides a cushion at the end of the throw of the guide follower from one corner of a polygonal guide hole into another corner thereof.

The advantages are illustrated in FIG. 3, where parts are shown schematically. The vertical columns in this figure illustrate at the lefthand side in column I the relationship between the shuttle block 13 and its post 14 with respect to the resiliently loaded drive arms 15, 16 in various positions respectively illustrated in rows A, B, C, D and E where the rotor 30 has moved through 90° counterclockwise from position A to position E.

Column II of FIG. 3 illustrates a guide arm 20 having a circular follower hole 22 as in FIG. 5 about the guide rod 25, for each position of the suttle block 13 shown in rows A, B, C, D and E.

Column III of FIG. 3 illustrates a guide follower arm 20 with a square orbit defining hole 21 per FIG. 2 about the guide rod 25, the relative position of the follower hole 21 with respect to the guide rod 25 being illustrated for each position of the shuttle block 13 shown in rows A, B, C, D and E.

With a circular orbit defining hole 22 as shown in FIG. 5 and in column II in FIG. 3, both arms 15, 16 exert substantially the same force on the post 14 and there is a gradual constant orbiting movement of the shuttle block 13 as the follower hole 22 slides around the fixed guide rod 25. With an orbit defining guide hole of polygonal shape, such as the square hole 21 of FIG. 2 and column III of FIG. 3, the orbital movement of the shuttle block 13 is quite different in that the shuttle block will move abruptly from one position to the next and in which typically 99% or more of eroding action between the electrode and the workpiece will take place while the guide rod 25 is in one of the corners of the hole 21 and 1% or less of the eroding action will take place while the electrode is in transit. This is all explained in Patent No. 3,809,852.

The double arm drive mechanism of the present invention is beneficial for both situations, that is for a situation in which the orbit defining hole is circular as at 22, and also when it is polygonal as at 21. In both cases, the beneficial results occur because the driving load is shared between the two arms 15, 16. In the case of a polygonal orbit defining hole, one arm is the dominant arm which imposes the major portion of the pressure on the post 14 to tend to cause movement of the shuttle block 13 and to impose pressure of the guide arm 20 on the guide rod 25. The other or subservient arm also exerts pressure on the post 14, but depending upon the rotary position of the rotor 30 will exert less pressure than the dominant arm and which will include a component which is opposed to the pressure of the dominant arm. The roles of the two arms as between dominant and subservient will change as rotor 30 turns and as the arm springs 34 successively store and release energy. During part of the cycle, one arm will be dominant and in another part of the cycle that arm will be subservient. In other parts of the cycle, both arms will exert equal pressure of guide arm 20 on the guide rod 25.

The respective arms 15, 16 will always exert pressure on the post 14 in proportion to the load on their respective springs 34. In the case of a polygon shaped orbit defining hole, as the rotor 30 turns, the springs for both arms will become loaded or unloaded at unequal rates, thus causing unequal components of pressure. While in the drawings the two arms 15, 16 are illustrated as mounted at right angles, so that the pressure of the arms are imposed on the post 14 at circumferentially spaced points 90° apart, this is not critical inasmuch as the arms 15, 16 could be mounted at circumferentially spaced points other than 90°.

In the two examples of columns II and III of FIG. 3, it will be observed that as the rotor 30 turns counterclockwise through 90° from its position A to position E, the guide follower arm 20 of column II will move gradually and continuously around the fixed guide rod 25 through an arc of 90°. This movement will be smooth, without jumps and dwells because the forces imposed upon the post 14 by the two drive arms 15, 16 are partially counterbalanced and there will be no sudden imposition of pressure upon the guide follower arm 20 as would otherwise occur if only a single drive arm imposed its pressure on the post 14.

In the example of the square hole 21 in column III of FIG. 3, the movement of the shuttle block 13 will take place only intermittently and the guide rod 25 will dwell in the corners of the orbit defining hole 21 for virtually all of the time of its orbit and the movement from one corner to the other will be relatively abrupt. However, during its movement as, for example, from the position shown in row C to row D, the subservient arm will exert a component of force on the post 14 which is opposed to but less than the component of force exerted on post 14 by the dominant arm, thus cushioning the impact shock or "slamming" of the guide follower against the guide rod 25. at the end of the guide follower movement. This cushion or shock absorption relieves the electric discharge machine servo system of vibration which might otherwise cause malfunction or erratic operation.

The feature of the invention which reduces the disruptive effect of a short circuit is illustrated in FIGS. 1 and 4. At some convenient point along the guide follower arm 20 it is provided with a key socket 40. As illustrated in FIG. 1, key socket 40 is between the guide rod housing 26 and the quill 27. In FIG. 4, it is disposed in a lateral extension 41 of the guide follower arm 20 and laterally beyond the guide rod housing 26. It is generally immaterial where the socket 40 is provided, the foregoing two examples being exemplarly only.

A retractable key or plug 42 is mounted on the machine frame 43 and is biased by spring 44 away from engagement with socket 40. A stem 45 for the key 42 is actuated by a solenoid 46 in the illustrated example. Other key actuating mechanisms such as hydraulic or pneumatic motors, etc., could be substituted. The electrical system herein illustrated is merely one example.

The socket 40 is located in the guide arm follower 20 in such a position that when key 42 is engaged therewith, the orbit defining hole 21 or 22 or 23, as shown in FIGS. 2, 5 and 6 will be centered with respect to the guide rod 25 and in the same time the electrode 10 will be centered with respect to its orbit in the cavity 47 in workpiece 24.

In the event of a short circuit between the electrode 10 and the workpiece 24, the conventional servo control system of the electric discharge machine will cause the quill 27 to retract, thus to clear the short circuit. The servo mechanism is conventional and is only illustrated diagrammatically in FIG. 4. Quill 27 is mounted in a fixed machine frame 48 and is movable vertically in the frame. Quill 27 may be hydraulically driven and has a hydraulic servo valve 51 in the hydraulic circuit. Valve 51 is subject to electric control mechanism on the main control panel 52 which has a terminal block 53 for the servo "down" signal and a terminal block 54 for the servo "up" signal.

The servo "down" signal is triggered by the machine cycle start button (not shown). The servo control mechanism is such that in the event there is a short circuit between the electrode 10 and the workpiece 24 the servo "up" signal terminal block 54 will send an electric signal through the circuit 56 to the servo valve 51 to retract the quill 27, thus to withdraw the electrode upwardly from the workpiece 24 and clear the short circuit. In a electric discharge machine with an electrode orbiting mechanism, however, the electrode 10 will be in close proximity to the walls of the workpiece cavity 47 and this circumstance will increase the time required to clear the electrode from the workpiece and relieve the short circuit.

In accordance with the present invention, the servo "up" signal which retracts the electrode upwardly will also send a signal through circuit 57 to solenoid 46 to advance the key 42 into engagement with socket 40 and hence withdraw the electrode 10 laterally from its orbital path to a centered position with respect to its orbit and in which there is a wider spacing between the electrode 10 and the wall of the workpiece cavity 47. This increased lateral spacing results in an earlier breaking of the short circuit than would otherwise occur.

While the electrode 10 is withdrawn from proximity to the walls of cavity 47, the normal oil flow around the electrode which is characteristic of electric discharge machine operation will flush any short circuiting metallic particles from between the electrode and the workpiece cavity wall to relieve the short circuit.

When the servo mechanism senses the breaking of the short circuit the servo "down" signal terminal block 53 will then signal the servo valve 51 through circuit 58 to advance the quill 27 and the electrode 10 downwardly back into the cavity 47 of the workpiece 24. At the same time, the servo "up" signal will be discontinued, thus to deenergize solenoid 46. Spring 44 will then retract the key 42 out of the socket 40 and the springs 34 on the drive arms 15, 16 of the orbiting drive mechanism will return the guide follower arm 20 to its proper orbit position with respect to the guide rod 25 and return the electrode 10 into close proximity to the wall of cavity 47 in workpiece 24 where electric discharge machining operations can resume where they were left off.

FIG. 1 shows the key plug 42 engaged in socket 40, thus centering the electrode with respect to its orbit. FIG. 7 shows a typical relative position between the key plug 42 and socket 40 in arm 20 when the electrode 10 is cycling on its orbit and is in close proximity to the wall of the workpiece cavity 47. The axis 61 of advance of the key is offset from the axis 62 of the socket 40. However, both the key plug 42 and socket 40 having correspondingly downwardly tapered walls. Accordingly, when solenoid 46 is actuated to advance key plug 42 into socket 40, the tapered side walls thereof will cam arm 20 laterally and will bring axes 61, 62 into coincidence, as shown in FIG. 1.

What is claimed is:

1. In an electric discharge machine having an electrode holder and means for driving said holder on an orbital path, said means including a post on the electrode holder, a rotor about the post and a first resiliently loaded drive arm mounted on the rotor and engaged with the post, the improvement comprising a second resiliently loaded drive arm mounted on the rotor and engaged with the post at a point offset circumferentially from the point of engagement with the post of the first-mentioned drive arm whereby the post is subject to the composite driving force of both drive arms.

2. In the machine of claim 1 in which the electrode holder is provided with a guide follower having an orbit defining hole and a guide rod through said hole, said drive arms respectively imposing components of force on the post.

3. The machine of claim 2 in which the orbit defining hole is circular, the components of force exerted on the post by the drive arms tending to smooth the movement of the guide follower with respect to the guide rod.

4. The machine of claim 2 in which the orbit defining hole is polygon shaped, one of said drive arms comprising a dominant drive arm and the other drive arm comprising a subservient drive arm which imposes a component of force on the post which opposes the force imposed by the dominant arm and reduces the shock of impact of the guide rod and follower.

* * * * *